Patented Feb. 14, 1933

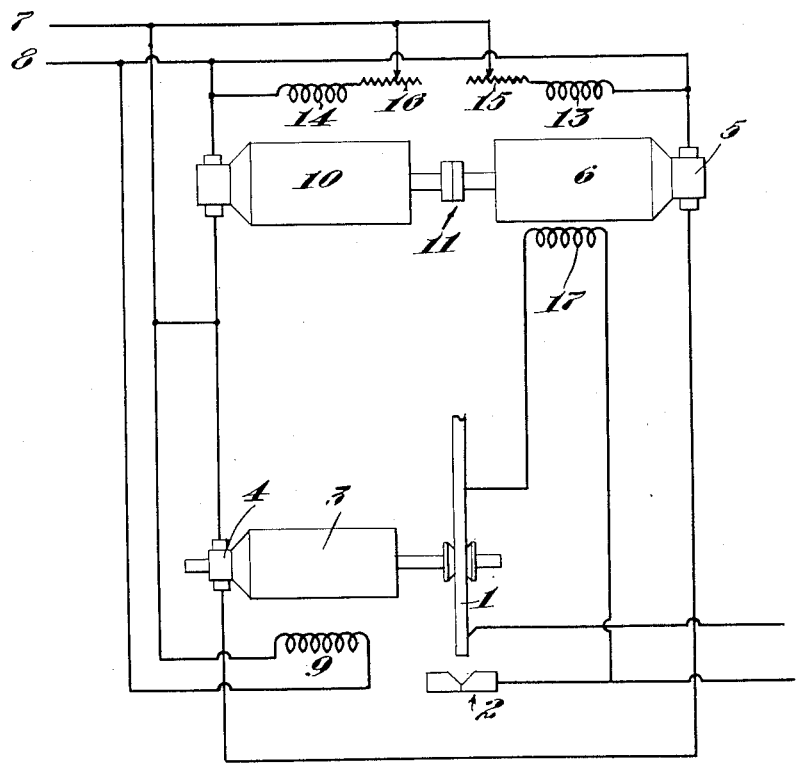

1,897,134

UNITED STATES PATENT OFFICE

ALVIN S. MANCIB, OF SOMERVILLE, MASSACHUSETTS, ASSIGNOR TO JAMES S. SMYSER, OF BRIGHTON, MASSACHUSETTS

ELECTRICAL APPARATUS

Application filed October 16, 1930. Serial No. 489,058.

This invention pertains to electrical apparatus and relates more particularly to means for regulating, controlling, or indicating the operation of electrically energized apparatus or electrical apparatus of any type. I am aware of certain desirable and useful apparatus of this type previously devised, wherein two electric motors are differentially associated with a movable element in such a manner that the rate and direction of movement of the movable elements are directly related to the difference in speed of the two motors.

As herein disclosed by way of example, the invention is embodied in arc-welding apparatus comprising a motor driven feed roll for advancing or retracting the electrode, the improved construction being such as to insure the provision of ample power in the motor for moving the feed roll and consequently the electrode, great stability in the motion of the electrode since its movements are very positive both in magnitude and direction; to provide for great flexibility of operation since it permits regulation of the arc length to maintain constant arc voltage under any operating conditions; to permit the use of heavy electrodes for use with heavy currents such as are necessary under certain conditions; to permit employment of standard equipment, thus keeping cost of production at a minimum; and at the same time being capable of embodiment in a simple construction.

The drawing consists of a diagram illustrating the circuit of my invention.

The apparatus illustrated is specifically designed for arc welding, although it is clear that it may be used for controlling devices other than arc-welding devices, particularly where a constant potential is desired between two points in a circuit. As shown, the movable element 1 (the electrode), connected in the controlled or welding circuit, is moved toward or from the work 2 by rotation of the shaft of motor 3. This may be accomplished by direct connection, or preferably through a system of gearing permitting the motor shaft to make several rotations corresponding to a small movement of the electrode. The armature 4 of motor 3 is in series with the armature 5 of a controlling motor 6 of the controlling circuit which is fed by power supply lines 7 and 8. Motor 3 is supplied with a field 9 connected across the same supply circuit in any desired manner, a separately excited field being found preferable. A second control motor 10 has its rotor directly connected to the rotor of control motor 6 by means of a coupling 11, as shown, or any other desirable connecting means, for example, gearing or belting or by being mounted on a single shaft. The armature of motor 10 is connected directly across the supply circuit comprising lines 7 and 8. The motors 6 and 10 have fields indicated at 13 and 14 respectively, which are fed from the supply circuit, each field preferably being connected as a shunt field. Either or both of these fields may have a rheostat or other means for varying the current and thereby varying the field, rheostats 15 and 16 being illustrative of such devices. In addition to the field 13 of the motor 6 there is an auxiliary field 17 which is connected in the welding circuit and is cumulative with respect to the field 13. This connection preferably is connected in parallel with the arc to obtain the most satisfactory results.

Since the field 9 is separately excited and does not change, it will be clear that the rotation of the armature of motor 3, and accordingly the direction of motion of the movable welding element 1, will depend upon which way the current flows through the rotor of motor 3. When field windings 13 and 14 furnish the same excitation to their respective armatures, there will be no opposed torque on the shaft which connects them. When the effective strength of the field of motor 6 is changed by varying the strength of field 17, one of the motors 6 or 10 having the weaker field will drive the other as a generator. Thus, it will be seen that the unit having the stronger field will act as a dynamic break to prevent excessive changes in speed.

Starting with electrode 1 out of contact with the work 2, before the arc has been formed, the potential between them will be that of the welding generator on open circuit. The auxiliary winding 17 will then have its maximum excitation and the motor 6, because of its stronger field, will be operating as a generator, supplying current to the armature of motor 3 and causing the latter to revolve in a direction to move the electrode toward the work. When electrode 1 makes contact with the work 2, the winding 17 is de-energized. The field of the motor 6 now becomes weaker than the field of motor 10, and motor 10 acts as a generator. The direction of current through the armature 5 of motor 6 and accordingly through the armature of motor 3 is reversed, causing the direction of movement of electrode 1 to change so as to withdraw it from the work. As soon as this happens the arc elongates and the increased voltage and resistance at the arc causes current to flow through the field 17, which current increases as the arc lengthens. Two agencies contribute to the increase in arc length, one being the retracting movement of the feed roll, and the other the fusion of the electrode in the arc. The former will become less effective as the excitation in 17 increases, and the motor 3 will revolve more and more slowly in the electrode retracting direction until it comes to rest. However, continued lengthening of the arc, due to fusion, will result in strengthening the field of motor 6 until current is caused to flow through the armature of motor 3 in the opposite direction and the electrode will start to feed toward the work. The welding operation thus becomes continuous, the electrode advancing steadily toward the work at the same rate that it is consumed in the arc. By providing a rheostat in the main winding of either motor 6 or motor 10, a means for manually varying the field of these motors is provided, and by varying the field strength the effect of the auxiliary field can be increased or decreased. This results in either a lengthening or a shortening of the arc, so that an arc of any desired potential may be maintained.

It is thus evident that after having adjusted the rheostat for a given arc potential, such potential is substantially maintained, after the arc has been struck, due to the fact that the potential across the arc gap is dependent upon the position of the movable electrode, while the position of the electrode is determined in response to the potential across the arc gap.

It should be understood that the present disclosure is for the purpose of illustration only and that this invention includes all modifications and equivalents which fall within the scope of the appended claims.

I claim:

1. Apparatus of the class described comprising a movable part whose position determines the potential in an electrical circuit, a motor for moving said part, said motor having a rotor and a separately excited field, and a motor-generator set adapted alternatively to supply current in opposite directions respectively to the rotor of said first motor, whereby to cause the latter to advance or retract said movable part.

2. Apparatus of the class described comprising a movable part whose position determines the potential in an electrical circuit, a motor for moving said part, said motor having a rotor and a separately excited field, and a pair of control motors having mechanically connected rotors, one at least of said control motors being in series with the rotor of the first motor, one of said control motors having an auxiliary field so connected with the circuit whose potential is determined by said movable part as to vary in intensity in accordance with the position of said part.

3. In a device of the character described, a movable resistance varying element in a circuit, a motor actuating said element, a control motor having its rotor in series connection with the rotor of the first motor, an auxiliary field winding for said control motor connected in the circuit for said movable element, and a second control motor having its shaft directly connected to the shaft of said first control motor.

4. In a device of the character described, a movable resistance varying element in an electrical circuit, a motor actuating said element, a pair of control motors having their shafts directly connected together, one of said control motors having an auxiliary field energized by the circuit for said movable element, one of said control motors having its armature in series with the armature of said first motor, and means for varying the strength of the main field of one of said control motors.

5. In a device of the character described, a movable resistance varying element in an electrical circuit, a motor actuating said element, a control motor having its armature in series connection with the armature of the first motor, an auxiliary field for said control motor in parallel with the resistance, and a second control motor having its shaft directly connected to the shaft of said first control motor.

6. In a device of the character described, a movable resistance varying element in an electrical circuit, a motor actuating said element, a control motor having its armature in series connection with the armature of the first motor, an auxiliary field for said control motor in parallel with the resistance, a second control motor having its shaft directly connected to the shaft of said first control motor, and means for varying the effective field strength of the first control motor.

7. An electric arc-welding device, a pair of electrodes, one at least of which is movable, and means to maintain an arc of constant potential between said electrodes, said means comprising a motor for moving one electrode, and means to determine the direction of rotation of said motor, said means comprising two control motors having their shafts directly connected together, one at least of said motors having its armature in series with the armature of said first motor, means to supply current to said control motors, and means for varying the effective strength of the field of one of said control motors relatively to that of the other control motor.

8. An electric arc-welding device, a pair of electrodes, one at least of which is movable, and means to maintain an arc of constant potential between said electrodes, said means comprising an electrode motor for moving one electrode, means to determine the direction of rotation of said motor, said latter means comprising two control motors having their shafts connected together, one of said control motors having an auxiliary field in parallel with said arc, and one of said motors having its armature in series with the armature of said first motor, and means for manually adjusting the strength of the main field of one of the control motors relatively to that of the other so as to change the effect of the auxiliary field at will, whereby the current strength in the armature of the electrode motor is so changed as correspondingly to change the normal position of the electrode.

9. An electrical control system of the character described comprising a controlled circuit including a movable element whose position determines the resistance in said circuit, a controlling circuit having a motor-generator set connected therein, said motor generator set having an auxiliary field whose strength varies in accordance with the position of said movable element, variations in the strength of said auxiliary field producing electrical fluctuations in said controlling circuit, and electromagnetic means for actuating said movable element, said means being so connected in said controlling circuit as to be responsive to said fluctuations.

10. An electrical control system of the character described comprising a controlled circuit including a movable-resistance varying element, a controlling circuit including a motor-generator set having an auxiliary field so connected in the controlled circuit that its strength varies in accordance with the variations in resistance in said controlled circuit, variations in the strength of said auxiliary field producing electrical fluctuations in said controlling circuit, and a motor for actuating said resistance varying element, said motor being so connected in said controlling circuit as to be responsive to said electrical fluctuations.

11. An electrical control system comprising a controlled circuit including a movable element whose position determines the potential in said circuit, a controlling circuit, a motor-generator set adapted to supply current alternatively in opposite directions to said controlling circuit, said motor-generator set having an auxiliary field so connected in said controlled circuit that its strength varies in accordance with variations in potential in said controlled circuit, variations in the strength of said auxiliary field causing fluctuations in current in said controlling circuit, and a motor for actuating said movable element, said motor being connected in said controlling circuit and responsive to fluctuations in current therein.

12. Welding apparatus comprising a welding circuit including relatively movable arc electrodes, a controlling circuit, a motor-generator set adapted to supply current alternatively in opposite directions to said controlling circuit, said motor-generator set having an auxiliary field so connected in said welding circuit that its strength varies in accordance with variations in the relative positions of said electrodes, variations in the strength of said auxiliary field producing fluctuations in current in said controlling circuit, and a motor for moving one of said electrodes, said motor having a substantially constant field and having its armature connected in series in said controlling circuit and responsive to fluctuations in current therein.

Signed by me at Boston, Massachusetts, this 14th day of October, 1930.

ALVIN S. MANCIB.